(12) United States Patent
Marx

(10) Patent No.: US 11,734,776 B2
(45) Date of Patent: Aug. 22, 2023

(54) OPEN-LOOP AND/OR CLOSED-LOOP CONTROL OF POWER GENERATION INSTALLATIONS

(71) Applicant: Thomas Marx, Düsseldorf (DE)

(72) Inventor: Thomas Marx, Düsseldorf (DE)

(73) Assignee: innogy SE, Essen (DE)

( * ) Notice: Subject to any disclaimer, the term of this patent is extended or adjusted under 35 U.S.C. 154(b) by 82 days.

(21) Appl. No.: 16/815,741

(22) Filed: Mar. 11, 2020

(65) Prior Publication Data
US 2020/0211129 A1 Jul. 2, 2020

Related U.S. Application Data

(63) Continuation of application No. PCT/EP2018/074447, filed on Sep. 11, 2018.

(30) Foreign Application Priority Data

Sep. 11, 2017 (DE) ...................... 10 2017 120 946.8

(51) Int. Cl.
*G06Q 50/06* (2012.01)
*G05B 15/02* (2006.01)

(52) U.S. Cl.
CPC ............. *G06Q 50/06* (2013.01); *G05B 15/02* (2013.01)

(58) Field of Classification Search
CPC ........ G06Q 10/04; G06Q 50/06; G05B 15/02; Y04S 10/50; Y04S 20/222; H02J 3/003; H02J 3/381; H02J 3/46; H02J 3/48; H02J 2203/10; H02J 2300/28; Y02E 10/56
See application file for complete search history.

(56) References Cited

U.S. PATENT DOCUMENTS

| | | | |
|---|---|---|---|
| 10,504,195 B2 * | 12/2019 | Sun .................... | H02J 3/382 |
| 10,635,056 B2 * | 4/2020 | Irisarri ................ | G06Q 50/06 |
| 10,879,695 B2 * | 12/2020 | Matan .................. | H02J 3/38 |
| 2004/0133529 A1 | 7/2004 | Munster | |

(Continued)

FOREIGN PATENT DOCUMENTS

| | | |
|---|---|---|
| EP | 2 343 791 A2 | 7/2011 |
| EP | 2 733 810 A2 | 5/2014 |

*Primary Examiner* — M. N. Von Buhr
(74) *Attorney, Agent, or Firm* — Reinhart Boerner Van Deuren P.C.

(57) ABSTRACT

A method performed in which a forecast, a generation information, and a regulation information are obtained. A control information is determined in the event that the regulation information is indicative of over- or underproduction. The control information is indicative of a control of the amount of electrical energy generated by power generating plants. The control information is determined based on the obtained regulation and generation information. Based on the time at which the regulation information is obtained, the remaining time of a predetermined interval is determined. Operating points for the plants are determined such that, for the remaining time, the amount of energy generated by the plants for the predetermined interval saves or generates at least one determined difference between the amount of energy generated according to the forecast and generation information. The operating points are based on the control information. The determined control information is output.

15 Claims, 6 Drawing Sheets

(56) References Cited

U.S. PATENT DOCUMENTS

| | | | |
|---|---|---|---|
| 2007/0067068 A1* | 3/2007 | Havlena | G05B 13/048 |
| | | | 700/291 |
| 2008/0249665 A1 | 10/2008 | Emery et al. | |
| 2011/0172838 A1* | 7/2011 | Pai | G06Q 10/06312 |
| | | | 700/292 |
| 2012/0029720 A1 | 2/2012 | Cherian et al. | |
| 2012/0296482 A1* | 11/2012 | Steven | G06Q 10/00 |
| | | | 700/291 |
| 2012/0326503 A1* | 12/2012 | Birkelund | H02J 13/0006 |
| | | | 307/24 |
| 2013/0043725 A1 | 2/2013 | Birkelund | |
| 2013/0166084 A1* | 6/2013 | Sedighy | G06Q 50/06 |
| | | | 700/291 |
| 2014/0142779 A1* | 5/2014 | Stoettrup | H02J 3/382 |
| | | | 700/297 |
| 2014/0257586 A1* | 9/2014 | Pai | G06Q 50/06 |
| | | | 700/291 |
| 2016/0013645 A1 | 1/2016 | Matsuda et al. | |
| 2016/0062380 A1* | 3/2016 | Schwarz | G05F 1/66 |
| | | | 700/295 |
| 2016/0187910 A1 | 6/2016 | Moreno | |
| 2017/0104449 A1* | 4/2017 | Drees | G01W 1/12 |
| 2017/0345107 A1* | 11/2017 | Hirata | H02J 3/383 |
| 2018/0223812 A1* | 8/2018 | Badrinath Krishna | |
| | | | F03D 7/046 |
| 2019/0064757 A1* | 2/2019 | Ramamurthy | G05B 13/048 |
| 2019/0340545 A1* | 11/2019 | Minegishi | G06N 3/04 |
| 2019/0372345 A1* | 12/2019 | Bain | G06Q 30/0601 |

* cited by examiner

| 1 | Feb-17 | | 21.02.2017 | | | 21.02.2017 | |
|---|---|---|---|---|---|---|---|
| | LT-Hedge Volume | | DA-Adjustments | | | Nominated Position | |
| | SELL MW | Price | BUY MW | SELL MW | Price | SELL MW | Price |
| Hour 1 | 85,00 | 35,44 | 0,0 | 103,27 | 30,27 | 188,70 | 32,60 |
| Hour 2 | 85,00 | 35,44 | 0,0 | 96,5 | 29,70 | 181,50 | 32,39 |
| Hour 3 | 85,00 | 35,44 | 0,0 | 91,7 | 29,70 | 176,70 | 32,46 |
| Hour 4 | 85,00 | 35,44 | 0,0 | 90,7 | 27,64 | 175,70 | 31,41 |
| Hour 5 | 85,00 | 35,44 | 0,0 | 87,1 | 26,89 | 172,10 | 31,11 |
| Hour 6 | 85,00 | 35,44 | 0,0 | 78,5 | 31,5 | 163,50 | 33,55 |
| Hour 7 | 85,00 | 35,44 | 0,0 | 67,7 | 38,20 | 152,70 | 36,66 |
| Hour 8 | 85,00 | 35,44 | 0,0 | 48,0 | 38,95 | 133,00 | 36,71 |
| ⋮ | | | | | | | |
| Hour 24 | 85,00 | 35,44 | 0,0 | 120,4 | 30,03 | 205,40 | 32,27 |

Fig.3a

| 2 | SELL MWh | Price |
|---|---|---|
| 07:00 | 38,18 | 36,66 |
| 07:15 | 38,18 | 36,66 |
| 07:30 | 38,18 | 36,66 |
| 07:45 | 38,18 | 36,66 |

Fig.3b

| 3 | Westereems | Rest NL WFs | Sum |
|---|---|---|---|
| | MWh | MWh | MWh |
| 21/02/2017 07:00 | 22,06 | 23,23 | 45,29 |

Fig.3c

| 4 | | Upward Regulation | Downward Regulation | Price Upward | Price Downward |
|---|---|---|---|---|---|
| | | MW | MW | EUR/MWh | EUR/MWh |
| 21/02/2017 | 07:00 | 0 | 0 | | |
| 21/02/2017 | 07:01 | 0 | 8 | | 32,61 |
| 21/02/2017 | 07:02 | 0 | 22 | | 30,27 |
| 21/02/2017 | 07:03 | 0 | 40 | | 26,42 |
| 21/02/2017 | 07:04 | 0 | 46 | | 21,93 |
| 21/02/2017 | 07:05 | 0 | 107 | | -100,73 |
| 21/02/2017 | 07:06 | 0 | 142 | | -455,13 |
| 21/02/2017 | 07:07 | 0 | 172 | | -455,13 |
| 21/02/2017 | 07:08 | 0 | 209 | | -455,13 |
| 21/02/2017 | 07:09 | 0 | 245 | | -455,13 |
| 21/02/2017 | 07:10 | 0 | 269 | | -455,13 |
| 21/02/2017 | 07:11 | 0 | 310 | | -455,13 |
| 21/02/2017 | 07:12 | 0 | 310 | | -455,13 |
| 21/02/2017 | 07:13 | 0 | 282 | | -455,13 |
| 21/02/2017 | 07:14 | 0 | 263 | | -455,13 |

Fig.3d

OPEN-LOOP AND/OR CLOSED-LOOP CONTROL OF POWER GENERATION INSTALLATIONS

CROSS-REFERENCE TO RELATED PATENT APPLICATIONS

This patent application is a continuation of PCT/EP2018/074447, filed Sep. 11, 2018, which claims the benefit of German Patent Application No. 10 2017 120 946.8, filed Sep. 11, 2017, the entire teachings and disclosure of which are incorporated herein by reference thereto.

FIELD OF THE INVENTION

The subject-matter relates to a method, an apparatus and a system for controlling and/or regulating one or more power generating plants, in particular for controlling and/or regulating the amount of electrical energy generated by the one or more power generating plants.

BACKGROUND OF THE INVENTION

In order to maintain the stability of an electrical energy grid—in particular to maintain the frequency of the electrical energy grid—overproduction or underproduction of electrical energy as well as reduced or increased demand for electrical energy from electrical energy consumers is controlled and/or regulated by means of a regulation energy—also known as "balancing energy". Regulation energy is therefore important to ensure grid stability in the transmission grid and, for example, to prevent power failures. Accordingly, the regulation energy can be fed additionally into the power grid, or additional electrical energy from the power grid can be consumed. If regulation energy is requested or needed, an allocation is charged to the participants.

Every participant in the electrical energy grid who feeds his generated electrical energy into the grid or takes it out of the grid must forecast the amount of electrical energy (a so-called long-term forecast) that he will feed into the grid (e.g. on the following day) or take out of the grid. For instance, the participants forecast the amount of regulation energy required on a daily or weekly basis for electrical energy market segments (e.g. primary reserve, secondary reserve, minute reserve), both for positive and negative regulation energy. How much regulation energy is actually required is determined, for example, on the basis of historical data. The trading and recording of the amount of electrical energy actually generated takes place on the so-called balancing energy market. A price to be paid for electrical energy according to a forecast is determined at this point, for example, and the electrical energy can be sold to electrical energy consumers. In addition, data is collected on the balancing energy market regarding the amount of electrical energy generated within the forecast intervals, so that a deviation from the forecast can be determined.

On the balancing energy market, a distinction is made with regard to remuneration between the provision and generation of regulation energy. Electrical energy producers, for example, submit bids for the provision of an amount of generated electrical energy, the so-called reserve capacity (output price), as well as, for example, an additional bid for the remuneration of the actual production (labor price) of the electrical energy.

A special feature of the balancing energy market is the pay-as-bid method. The bids on the balancing energy market are remunerated only with the prices actually offered. Each participant is paid according to the bid (pay).

This is in contrast to the pay-as-clear method. This represents a unit price method. Irrespective of the specific bid, payment is always made in accordance with the highest bid awarded in the respective participant.

In this context, it is particularly important for the electrical energy producers to ensure that the control energy complies as closely as possible with the predicted amount of electrical energy produced.

As already mentioned above, solutions are known from the state of the art which make the forecast required by the balancing energy market on the basis of historical data.

Due to the constantly growing share of so-called renewable energy, it is sometimes difficult to forecast the amount of electrical energy actually generated. As an example wind energy plants are mentioned, wherein it is obvious that the wind required to generate electrical energy is variable and difficult to predict long in advance (e.g. weeks or months according to the so-called long-term forecast).

SUMMARY OF SOME EXEMPLARY EMBODIMENTS

Considering the background of the described state of the art, the object is, thus, to reduce or avoid the described problems at least partially, i.e. in particular to perform and/or adapt a control and/or regulation system for power generating plants that feeds into the power grid as accurately as possible the amount of generated electrical energy that was forecast for a predetermined interval.

This object is solved by a method as disclosed herein.

According to a first aspect of the invention a method is described, performed by one or more apparatuses, the method comprising:

obtaining a forecast information indicative of an amount of electrical energy generated by one or more power generating plants that is to be generated within a predetermined interval;

obtaining a generation information indicative of an amount of electrical energy generated by said one or more power generating plants, wherein said amount of generated electrical energy corresponds to said amount of electrical energy generated by said one or more power generating plants within said predetermined interval and/or is directly predicted for said predetermined interval;

obtaining a regulatory information indicative of over- or underproduction of electrical energy generated by the one or more power generating plants for a given time within the predetermined interval;

determining a control information in the event that the regulatory information is indicative of over- or underproduction, wherein the control information is indicative of a control and/or regulation of the amount of electrical energy generated by the one or more power generating plants, wherein the determining of the control information is at least partially based on the obtained regulatory information and on the obtained generation information, wherein based on the determined time at which the regulatory information is obtained, the remaining time of the predetermined interval is determined, wherein one or more operating points for the one or more power generating plants are determined such that for the remaining time of the predetermined interval, the amount of electrical energy generated by the one or more power generating plants for the predetermined interval saves or generates at least one determined difference between the amount of electrical energy generated according to the forecast information and according to the generation information, and wherein said determined one or more operating points are comprised by the control information; and outputting or causing the outputting of the determined control information, wherein, based on the determined control information, a control and/or regulation of the one or more power generating plants is to be carried out.

According to a second aspect of the invention, an apparatus is described which is adapted or comprises corresponding means to perform and/or control a method according to the first aspect. Apparatuses of the method according to the first aspect are or comprise in particular one or more apparatuses according to the second aspect.

According to the second aspect of the invention an apparatus is also described, comprising at least one processor and at least one memory comprising computer program code, said at least one memory and said computer program code being adapted to perform and/or control with said at least one processor at least one method according to the first aspect. A processor is to be understood, for example, as a control unit, a microprocessor, a microcontroller, a digital signal processor (DSP), an application-specific integrated circuit (ASIC) or a field programmable gate array (FPGA).

For example, an exemplary apparatus further comprises means for storing information such as a program memory and/or a working memory. For example, an exemplary apparatus of the invention further comprises means for receiving and/or transmitting information via a network such as a network interface. For example, exemplary inventive apparatuses are interconnected and/or connectable via one or more networks.

An exemplary apparatus according to the second aspect is or comprises, for example, a data processing system which is set up in software and/or hardware to be able to carry out the respective steps of an exemplary method according to the second aspect. Examples of a data processing system are a computer, desktop computer, server, thin client and/or portable computer (mobile apparatus), such as a laptop computer, tablet computer, wearable, personal digital assistant or smartphone.

Individual method steps of the method according to the first aspect (for example the obtaining of a generation information) can be carried out with a sensor apparatus which also has at least one sensor element. Individual method steps (for example the determining of a control information), which for example does not necessarily have to be carried out with the sensor apparatus, can be carried out by a further apparatus which is connected, in particular via a communication system, to the apparatus which has at least one sensor element.

Further apparatuses may be provided, for example a server and/or for example a part or component of a so-called computer cloud, which dynamically provides data processing resources for different users in a communication system. In particular, a computer cloud is a data processing infrastructure according to the definition of the "National Institute for Standards and Technology" (NIST) for the English term "Cloud Computing". An example of a computer cloud is a Microsoft Windows Azure Platform.

According to the second aspect of the invention, a computer program is also described which comprises program instructions which cause a processor to perform and/or control a method according to the first aspect when the computer program runs on the processor. An exemplary program according to the invention may be stored in or on a computer-readable storage medium containing one or more programs.

According to the second aspect of the invention, a computer-readable storage medium comprising a computer program according to the second aspect is also described. A computer-readable storage medium can be designed as a magnetic, electrical, electro-magnetic, optical and/or other storage medium. Such a computer-readable storage medium is preferably representational (i.e. "touchable"), for example it is designed as a data carrier apparatus. Such a data carrier apparatus is for example portable or permanently installed in an apparatus. Examples of such a storage apparatus are volatile or non-volatile random access memory (RAM) such as NOR flash memory or sequential access memory such as NAND flash memory and/or read-only memory (ROM) or read-write memory. Computer-readable, for example, should be understood to mean that the storage medium can be read and/or written to by a computer or data processing system, for example by a processor.

According to a third aspect of the invention, a system is also described comprising multiple apparatuses which together perform a method according to the first aspect.

An exemplary system according to the third aspect comprises, as an example, one or more power generating plants which are configured and/or to set one or more operating points based on control information determined and output by the one or more apparatuses.

In the following, exemplary features and exemplary embodiments are explained in more detail according to all aspects of the present invention:

The forecast information is obtained (e.g. received), e.g. by an apparatus (e.g. a server) which is electrically connected to the one or more apparatuses performing the objective method. This electrical connection can, for example, be implemented via a communication network (e.g. the Internet). The forecast information is transmitted, for example, to the one or more apparatuses that perform the objective method.

The forecast information is indicative of an amount of electrical energy generated by the one or more power generating plants that is to be generated within a predetermined interval. For example, the predetermined interval has a defined length, e.g. 15 minutes. The predetermined interval is also called PTU (Program Time Unit).

For example, the forecast information is forecast by a participant in the electrical energy grid (e.g. electrical energy generator) on a day that lies before the day on which the predetermined interval is reached.

The generation information represents, for example, an amount of electrical energy generated by the one or more power generating plants within the predetermined interval (e.g. up to the time when the generation information is obtained).

The generation information represents, for example, predicted information about an amount of electrical energy generated by the one or more power generating plants, which is determined immediately before the start of the generation of electrical energy by the one or more power generating plants. For example, the amount of electrical energy generated by one or more power generating plants is predicted at 07:00 or 6:59 of a given day for a predetermined interval, e.g. over the period 07:00-07:15 of a given day. Accordingly, the generation information is immediately predested (for the next upcoming interval). The amount of generated electric energy according to the generation information can be predicted for a period of one hour, e.g. from 07:00-08:00 of a certain day, and accordingly the generation information can be divided into predetermined intervals, e.g. with a predetermined duration for the predetermined interval. The predetermined time period can be, for example, a predetermined period of 15 minutes for e.g. a Dutch energy market, for example. It is to be understood that the division of the generation information into predetermined intervals is possible for any given period of time within the period (e.g. of one hour). The generation information can, for example, be predicted at least partially based on weather forecast data or the like, so that the amount of electrical energy that is expected to be generated immediately in the (upcoming) predetermined interval can be predicted very accurately.

The obtained regulation information is indicative of over- or under-production of electrical energy generated by the one or more power generating plants within the predetermined interval. For example, the regulation information is indicative of overproduction for the specified interval if the specified interval has not yet expired and the amount of electrical energy to be generated according to the forecast information has already been generated for the specified interval, and vice versa. The regulation information is also indicative, for example, of compensation or penalty costs for an amount of electrical energy (e.g. in units of MWh) generated by the one or more power generating plants that is fed too much or too little into the grid during the predetermined interval.

For example, in this case, the control information is determined, for example, reducing the amount of generated electrical energy by the one or more power generating plants for the remaining period of the predetermined interval to reduce the amount of generated electrical energy that is greater than the amount of electrical energy according to the forecast information. Likewise, in the opposite case, if the one or more power generating plants have not yet generated the amount of electrical energy according to the forecast information for the remaining period of the predetermined interval, for example due to the fact that the one or more power generating plants do not generate electrical energy with the maximum possible generating capacity, the amount of electrical energy generated for this remaining period of the predetermined interval can be increased accordingly.

For example, the determined control information can be output or its output can be initiated. For example, the control information is transmitted to an apparatus which can control and/or regulate the one or more power generating plants, or this apparatus can transmit the determined control information, for example, to a corresponding apparatus which is configured and/or adapted to control and/or regulate the one or more power generating plants.

In this way, an over- or underproduction of electrical energy by the one or more power generating plants that is above or below the amount of electrical energy according to the forecast information can at least be minimized, for example, in order to at least minimize the sanctioning costs incurred by the balancing energy market.

For example, the one or more operating points for the one or more power generating plants represent a percentage value of the possible generation capacity of the one or more power generating plants, e.g. in an interval of 0% to 100%. Based on a certain amount of electrical energy that is expected to be generated (produced) too much or too little compared to the amount of electrical energy represented by the forecast information, for example, and the knowledge of the maximum possible generation capacity of the one or more power generating plants, the operating point can be determined to be, for example, 20%, so that the amount of electrical energy is generated by generating with 20% of the maximum possible amount of electrical energy of the one or more power generating plants.

One or more operating points are determined, for example, depending on the number of facilities comprises by the one or more power generating plants. For example, one operating point of the one or more operating points is assigned to one of the one or more power generating plants. A power generating plant can be controlled and/or regulated (also referred to as "driven") to one or more of these one or more operating points and then generate electrical energy according to this operating point.

It will be understood that all aspects of the objective method can be carried out in real time. The present method according to all aspects can thus be performed out repeatedly, wherein in each case after the control information has been determined, a control and/or regulation of the one or more power generating plants can be carried out. In particular, all aspects of the objective method can be carried out, for example, continuously or again after a predetermined period of time has elapsed (e.g. once per second, 5 times per second, to give some non-limiting examples).

In an exemplary embodiment according to all aspects, the method further comprises:
 obtaining an availability information indicative of the availability of one or more power generating plants, wherein the control information is further determined based on the obtained availability information.

The availability information represents, for example, a planned and/or unplanned availability of the one or more power generating plants.

The planned availability of the one or more power generating plants may, for example, involve maintenance of the one or more power generating plants. This is usually known and stored, for example, in a memory (e.g. database) as appropriate information. For example, planned maintenance of one or more power generating plants reduces (linearly) the available generation capacity of the one or more power generating plants.

The unplanned availability of the one or more power generating plants may, for example, be a defect or the like which occurs unplanned at the one or more power generating plants.

For example, the obtaining of availability information may be repeated (e.g. at predetermined time intervals, e.g. every second), and thus directly take into account the availability of the one or more power generating plants when the determining of the control information to control and/or regulation the one or more generating plants is performed.

In an exemplary embodiment according to all aspects, the obtaining of the regulatory information is performed with a time delay to the obtaining of the generation information, and the remaining time of the predetermined interval is further determined based on the time delay.

The time delay is for example 1 to 3 minutes, especially 2 minutes. It cannot be ruled out that in example embodiments the delay may be 0.5 to 1.5 and 1 minute or 2.5 to 5 minutes, or 3 to 4 minutes, for example, in deviation from the values stated above. Furthermore, in example embodiments no time delay can occur or the time delay can be 0 minutes, for example. This corresponds to the method according to all aspects being performed in real time.

The regulation information is provided by a transmission grid operator with a predetermined delay. In order to maximize the time to control and/or regulate the one or more power generating plants, a polling for the obtaining of the regulation information can be performed, for example, at predetermined intervals, preferably of approximately 0.1 seconds to 2 seconds, 0.2 to 1.5 seconds, 0.3 to 1 second, 0.4 to 0.9 seconds, 0.5 to 0.8 seconds, and 0.6 to 0.7 seconds. In this way, the regulation information can be obtained immediately after it has been provided by the transmission grid operator.

The regulation information represents, for example, the costs or remuneration of electrical energy generated by one or more power generating plants, taking into account the time delay. For example, the time delay before the regulation information can be gathered is about two minutes, as explained above. Accordingly, after the time delay has elapsed, it can be obtained that, for example, in the past two minutes there has already been over- or underproduction of electrical energy by the one or more power generating plants. In some cases, this may already have resulted in costs for the electrical energy producer, e.g. by imposing sanctions. The obtaining of an over- or underproduction implicitly comprises the recognition that, for example, the amount of electrical energy produced for the electrical energy grid for the predetermined interval on the previous day or intraday (also known as intraday) has already been exceeded or fallen short of. In the event of overproduction of the amount of electrical energy, this means that for the entire remaining duration of the predetermined interval, i.e. until it expires, the electrical energy producer will incur penalty costs by generating additional electrical energy.

An exemplary embodiment in all aspects provides that the forecast information comprises at least one long-term forecast information and at least one day-ahead forecast information which together totals the amount of electrical energy generated by the one or more power generating plants which is generated within the predetermined interval.

The forecast information comprises, for example, a so-called long-term forecast. The forecast information also comprises, for example, a so-called day-ahead forecast. Alternatively or additionally, the forecast information comprises a total which is calculated from the values of the long-term forecast and the day-ahead forecast.

The long-term forecast, for example, is indicative of the amount of electrical energy from the power grid that is likely to be demanded. This can be determined a long time in advance (e.g. weeks or months), e.g. on the basis of historical data from the previous year or similar.

For example, the day-ahead forecast is indicative of the amount of electrical energy that is expected to be needed in the power grid in addition to or less than the amount of electrical energy that is expected to be needed in the grid according to the long-term forecast. This day-ahead forecast is usually determined on the day before the amount of electrical energy is actually drawn from the grid.

Alternatively or additionally, the forecast information may also comprise, for example, at least an intraday forecast. For example, the intraday forecast is available in real time. For example, the intraday forecast is available at the latest before the start of the predetermined interval (e.g. 15 minute interval).

A further exemplary embodiment according to all aspects provides that the determining of the control information takes into account the time required to control and/or regulate the one or more power generating plants to the determined one or more operating points of the one or more power generating plants.

Correspondingly, the reduced or increased amount of electrical energy generated by the one or more power generating plants, which is also generated during the controlling and/or regulating of the one or more power generating plants, can be taken into account. For example, in the event that the one or more power generating plants are turned down from 100% to e.g. 20%, the amount of electrical energy produced during the shutdown to e.g. 20% of the maximum possible generation of the one or more power generating plants is taken into account.

In an exemplary embodiment, the determining of the control information further comprises:
  obtaining a remaining time information indicative of a time period until which the output or the initiation of the output of the determined control information must have taken place in order to control and/or regulate the one or more power generating plants to the maximum possible generation amount of electrical energy of the one or more power generating plants before the expiry of the predetermined interval,
  wherein the determining of the control information is further based on the obtained remaining time information.

In this way, it can be taken into account that the one or more power generating plant(s) is/are also controlled and/or regulated in time before the end of the predetermined interval (e.g. 15 minute period) to the maximum possible amount of electrical energy generated (e.g. generation capacity of 100%) by the one or more power generating plant(s).

An exemplary embodiment provides that, based on the one or more operating points for controlling and/or regulating the one or more power generating plants, one or more control parameters for the one or more power generating plants are determined, which set the one or more power generating plants to the one or more operating points.

The term "set"—also referred to as "driving"—refers to the fact that, for example, a start-up ramp and/or a turn-down ramp of the one or more power generating plants is implemented by the control parameters. For example, a power generating plant of the one or more power generating plants cannot simply be stopped, e.g. the operating point is set from 100% generating capacity to 0% generating capacity of the power generating plant. For example, individual functional parts of the power generating plant have to be controlled (e.g. a blade position of the rotor blades of a wind turbine) so that a generator generating electrical energy (e.g. a turbine of the wind turbine) is adjusted accordingly to the operating point. For a determination of the control parameters, for example, based on the one or more operating points of the one or more power generating plants, a query can be made to a storage, e.g. a database, in which parameters for the control and/or regulation of the one or more power generating plants are stored or linked to one or more operating points, e.g. in a matrix comprised by the storage. These stored control parameters can then be transmitted, for example, to the one or more apparatuses that perform the objective method. Accordingly, the control parameters can, for example, be output or its output can be initiated. Alternatively or additionally, these control parameters can, for example, be directly output to the one or more power generating plants or their output can be initiated, e.g. via an apparatus (e.g. server) which transmits the control parameters to the one or more power generating plants.

An exemplary embodiment according to all aspects provides that the determining of the control information further comprises:
  determining of a surplus information, wherein the surplus information determines those power generating plants of the one or more power generating plants which are to be reduced in the amount of generated electrical energy and which sanctioning causes the lowest costs, in the case that despite the maximum possible amount of generated electrical energy of the one or more power generating plants the amount of electrical energy is not generated according to the forecast information.

For example, one or more of the one or more power generating plants may be prioritized, e.g. by the transmission grid operator, because they are, for example, subject to particularly short-term control and/or regulation and/or monetary support. For example, these particular power generating plants can quickly supply additional electrical energy needed for the grid. By providing this function of the specific one or more power generating plants and their benefit to the grid over a long period of operation of the grid, they may, for example, be exempted from penalties.

In an exemplary embodiment according to all aspects, the one or more operating points have a lower limit which limits the minimum possible generating capacity of the respective power generating plant downwards.

The minimum possible generation capacity is also referred to as "minimum stable load", or alternatively be referred to as SEL (Stable Export Limit) of the one or more power generating plants. If this threshold of the respective one or more power generating plants is undercut, it could happen that the one or more power generating plants have to be disconnected from the grid for a longer period of time (e.g. disconnected) because they cannot be easily re-started to a generating operation. It could sometimes take several hours to (re)feed electrical energy generated by one or more power generating plants into the grid. The lower threshold accordingly ensures that the above-mentioned case is avoided. The lower threshold is, for example, 5% of the maximum possible generation capacity of the respective electrical energy generation plant of the one or more power generating plants.

An exemplary embodiment in all aspects provides that the one or more power generating plants comprise one or more power generating devices, wherein the determined control information sets the respective operating point for the respective power generating device in dependence on the operating points of the respective power generating plants, wherein the at least one operating point for the respective power generating plant is determined in such a way that the one or more power generating plants cumulatively save or generate more the difference of the amount of generated electric energy according to the generation information that is determined between the control information and the forecast information.

Within a power generating plant, which in turn comprises at least two power generating devices, it is possible, for example, to have a ratio dependent control and/or regulation of the individual power generating devices. For example, depending on the instantaneous generating power of the respective power generating device of the one or more power generating plants, a total generating power and, based on this, the amount of electrical energy generated by the one or more power generating plants can be determined. To enable a generation amount of electric energy of the one or more power generating apparatuses, for example, a power generating apparatus of the power generating devices can have an operating point of 80% of the maximum possible generation capacity of this power generating devices, and another power generating devices of the power generating devices can have an operating point of 20% of the maximum possible generation capacity of this power generating devices. In this example, the power generation plant generates 50% of the maximum possible output of the power generation plant. Accordingly, the control and/or regulation of the one or more power generating plants can be performed according to the determined control information.

Furthermore, multiple power generating plants can be controlled and/or regulated according to the abovementioned disclosure, so that multiple power generating plants feed a certain generating capacity of the maximum possible generating capacity of the power generating plants connected to the power grid into the power grid, wherein the respective power generating plants and their one or more power generating devices comprises therein can each have different operating points.

The outputting of the respective operating points to the power generating plants can, for example, be performed simultaneously or individually, so that simultaneous or individual control and/or regulation of the respective power generating plant and/or power generating devices comprised therein is feasible.

In a further exemplary embodiment according to all aspects, the control information further determines, taking into account that the one or more operating points of the one or more power generating plants is controlled and/or regulated again to the respective maximum possible generation power of electrical energy before the expiry of the predetermined interval.

In order to be able to generate as precisely as possible the amount of electrical energy determined according to the forecast information, which has already been determined for the next upcoming and predetermined interval, and in this upcoming and predetermined interval as precisely as possible the amount of electrical energy determined according to the forecast information, the one or more power generating plants are each set to the maximum possible generating capacity again at the end of the predetermined interval by means of the one or more operating points for the one or more power generating plants. In this way, it can be ensured that a respective predetermined interval is always started with the maximum possible generation capacity and associated with it and the amount of electrical energy generated by one or more power generating plants.

If, for example, after 13 minutes of a predetermined interval lasting 15 minutes, i.e. in the last third of the predetermined time interval, the one or more power generating plants would have to be controlled and/or regulated on the basis of a certain control information, this information is not followed in a further exemplary embodiment, since in response to a reduction in the generating capacity of the one or more power generating plants, the one or more power generating plants are immediately controlled and/or regulated again (due to the expiry of the predetermined interval) to the maximum possible generating capacity of the one or more power generating plants. In particular, in order to reduce the wear and tear of functional parts (e.g. a turbine of a wind turbine), the correspondingly determined control parameter is not output in this interval, since the duration for setting the one or more reduced operating points for the one or more power generating plants and the subsequent setting of the one or more operating points to the maximum possible generating power is not reasonable. Thus, in this case, for example, there is no control and/or regulation of the one or more power generating plants, since it is foreseeable, for example, that a ramp-up to generate more electrical energy by the one or more power generating plants would have to be followed by a direct ramp-down to decrease the amount of electrical energy to be generated.

A further exemplary embodiment according to all aspects is characterized in that the one or more operating points of the one or more power generating plants are automatically triggered to the maximum possible generation output of electrical energy by the one or more power generating plants at a point in time which lies before the expiry of the predetermined interval and is determined in such a way that with the expiry of the predetermined interval the one or more operating points of the one or more power generating plants are again controlled and/or regulated to the maximum possible generation output of electrical energy.

The one or more operating points of the one or more power generating plants are automatically controlled and/or regulated (e.g. by the one or more power generating plants independently, i.e. for example by a control unit integrated in or directly connected to a respective electrical energy generating installation). In order not to jeopardize the security of supply through the electrical energy grid by one or more operating points of the one or more power generating plants, e.g. in the event of a fault in the data line for transmitting the control parameters for setting the one or more operating points), this can be controlled and/or regulated accordingly for each predetermined interval in such a way that the maximum possible generating capacity of the one or more power generating plants can be provided at the beginning of each predetermined interval.

This can be done, for example, by means of an automatic reset, so that the maximum possible generation capacity is guaranteed again before the end of the predetermined interval. If, for example, the start-up of a power generation plant at an operating point of the "minimum stable load" lasts for a certain period of time, the rest can be triggered by this certain period of time before the end of the predetermined interval. In the case of a wind turbine, for example, this can be done about 30 s before the end of the predetermined interval.

In addition or alternatively, such a reset can be triggered variably, for example, if a power generation plant is operated above the minimum stable load, the start-up of this power generation plant takes less time than if the power generation plant had to be started up from the minimum stable load to the maximum possible generation capacity of the power generation plant.

Such a reset can, for example, be triggered by means of a control signal for starting up the one or more power generation systems, wherein the control signal—as already explained—is generated by the respective power generation plant itself. The advantage of this is that independence from a sometimes used communication network is achieved.

In an exemplary embodiment according to all aspects, the one or more electricity generating plants are photovoltaic plants, wind energy plants, hydroelectric or hydroelectric power plants (e.g. run-of-river, reservoir storage power plants and/or pumped storage power plants, to name but a few non-limiting examples), or a combination thereof.

It is to be understood that the respective power generating plants, for example the respective wind turbines as power generating plants may comprise, for example, one or more wind turbines. The same applies to one or more photovoltaic systems or the like, to name but a few non-limiting examples. Wind turbines can be both onshore and offshore wind turbines, for example.

The respective power generating plants can be located in different (geographical) places. For example, the respective power generation devices of multiple power generating plants may be located in different countries. Accordingly, for example, according to the specific control information, control and/or regulation of multiple power generating plants located in different countries (e.g. in Germany, the Netherlands, and France) can take place. For example, the determined control information can also be used to control and/or regulate several power generating plants located in different countries, each of which is of a different type, such as one (or more) wind turbine generator(s) in Germany, one (or more) wind turbine generator(s) in the Netherlands, and one (or more) hydropower generator(s) in France, to give a non-limiting example.

In a further exemplary embodiment according to all aspects, the determining of the control information further comprises:
  determining a prediction information indicative of a predicted regulatory information for a period shorter than the remaining period of the predetermined interval, wherein the prediction information is determined based on historical information,
  wherein the control information is further determined based on the determined prediction information.

For example, the period of time shorter than the remaining time of the predetermined interval may affect the next 2 to 5 minutes of a 15 minute interval, to name but one non-limiting example.

For example, the determined prediction information realizes a forecast model which, for example, continuously predicts the regulation information for a pending period within the predetermined interval. In particular, the prediction information can be used, for example, to predetermine the regulation information for the period identical to the delay with which the regulation information is published (e.g. by the transmission grid operator).

The object of the invention is further solved by a system, the system comprising one or more apparatuses which together are configured and/or arranged to perform an objective method.

An exemplary embodiment is characterized in that the system further comprises one or more power generating plants which are configured and/or arranged to set one or more operating points based on control information determined and output by the one or more apparatuses.

The exemplary embodiments described above in this description should also be understood in all combinations with each other. In particular, exemplary embodiments are to be understood in terms of the different aspects disclosed.

In particular, the prior or subsequent description of methods steps according to preferred embodiments of a method should also disclose corresponding means for performing the method steps by preferred embodiments of an apparatus. Likewise, the disclosure of means of an apparatus for performing a method step should also disclose the corresponding method step.

Further advantageous exemplary embodiments can be found in the following detailed description of some exemplary embodiments, especially in connection with the figures. However, the figures should only serve the purpose of clarification and not to determine the scope of protection. The figures are not to scale and are only intended to reflect the general concept in an exemplary manner. In particular, features comprised by the figures should in no way be regarded as necessary components.

BRIEF DESCRIPTION OF THE DRAWINGS

FIGS. 3a-d depict an exemplary table with information, which is used in an exemplary method according to an embodiment;

DETAILED DESCRIPTION OF SOME EXEMPLARY EMBODIMENTS OF THE INVENTION

Figure 1:
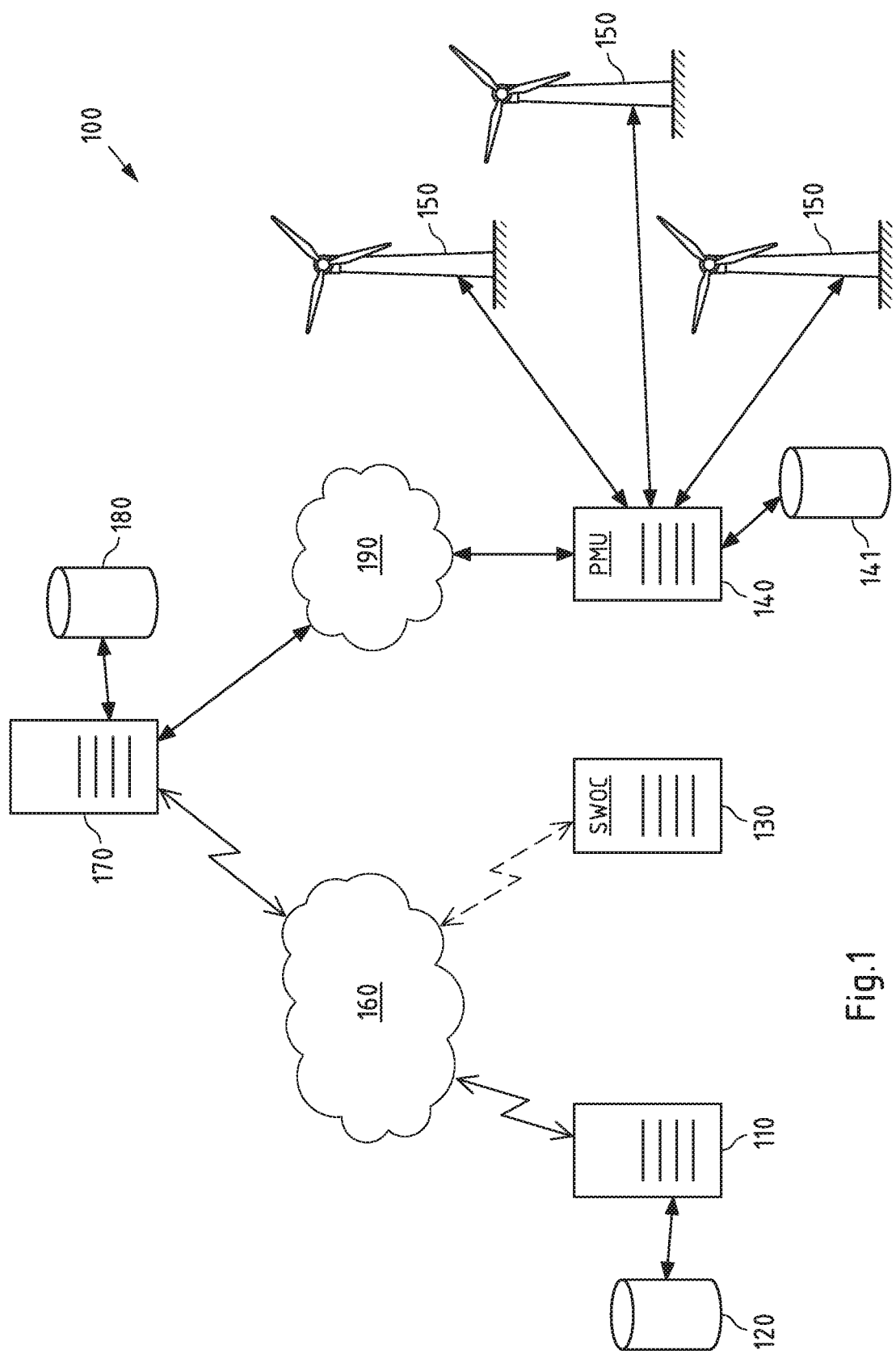
FIG. 1 is an exemplary system according to an embodiment.

FIG. 1 shows an exemplary system according to an embodiment.

System 100 comprises an apparatus 110 (e.g. a server) which can, for example, execute and/or perform the method according all aspects. The apparatus 110 is connected, for example, to a memory 120, which comprises, for example, a database. In particular, memory 120 can be used to temporarily store information for processing and/or to store and access recorded information.

The system 100 also comprises a further server 130, a so-called SWOC (Smart Wind Operation Controller) and a server 140, a so-called PMU (Power Management Unit). The PMU 140 is connected to several power generating plant 150, in this case wind turbines, whose control and/or regulation is possible, for example, via one or more control parameters from the PMU 140. By means of the control parameters, one or more operating points of the power generating plant 150 can be controlled and/or regulated. The control parameters can, for example, be stored in memory 120 and linked or connected to one or more operating points for the power generation plant 150, e.g. by means of a matrix.

System 100 also comprises a transmission grid (electrical energy grid) 190, by means of which the electrical energy or electrical energy generated by the power generating plant 150 can be transmitted to one or more consumers (not shown in FIG. 1). The connection of the power generating plant 150 to the transmission grid 190 is shown schematically by means of the double arrow between the PMU 140 and the transmission grid 190.

A server 170, optionally connected to an additional storage 180 operated by the transmission grid operator, is also connected to the transmission grid 190.

The system 100 also comprises a communication network 160 (e.g. the Internet), wherein information can be exchanged between at least two entities of the system 100 via the communication network 160.

A communication connection between the apparatus 110 and the SWOC 130 can be made either directly (shown schematically with the double arrow connecting the apparatus 110 with the SWOC 130) and/or indirectly (e.g. as a redundancy connection) via the communication network 160 (shown schematically with the double arrows pointing into the communication network between the communication network 160 and the apparatus 110 or the SWOC 130).

The transmission grid operator, for example, stores a regulation information determined by him in the memory 180, and makes it available by means of an access to the server 170. Accordingly, this regulation information can be obtained by apparatus 110, for example, via the communication network 160. Furthermore, a forecast information can be stored in memory 180 for access. A generation information can also be stored in memory 180. Alternatively, the generation information can be provided by another server (not shown in FIG. 1) of a third party, e.g. via the communication network.

For example, a determined control information can be output by the apparatus 110 via the SWOC 130 to the PMU 140, wherein the PMU 140, for example, performs control and/or regulation of the power generating plants 150 based on the received control information. For this purpose, for example, control parameters stored in a memory 141 connected to the PMU 140 can be determined for the specific control information. These parameters can be used to set an operating point that limits the maximum possible amount of electrical energy generated by the power generating plant 150. Alternatively, these control parameters can be stored in memory 120, wherein after the output of the determined control information, the apparatus 110 determines the control parameters and transmits them, for example, to the PMU 140 together with the control information.

For example, the PMU 140 can also automatically trigger the one or more operating points of the one or more power generating plants to the maximum possible generation capacity of electrical energy, since the PMU 140 is located, for example, at the same location of the power generation plant 150 or in its immediate vicinity.

Between the SWOC server 130 and the PMU 140, for example, there is a communication connection according to the MODBUS standard, which enables a fast connection with low latency.

Figure 2:
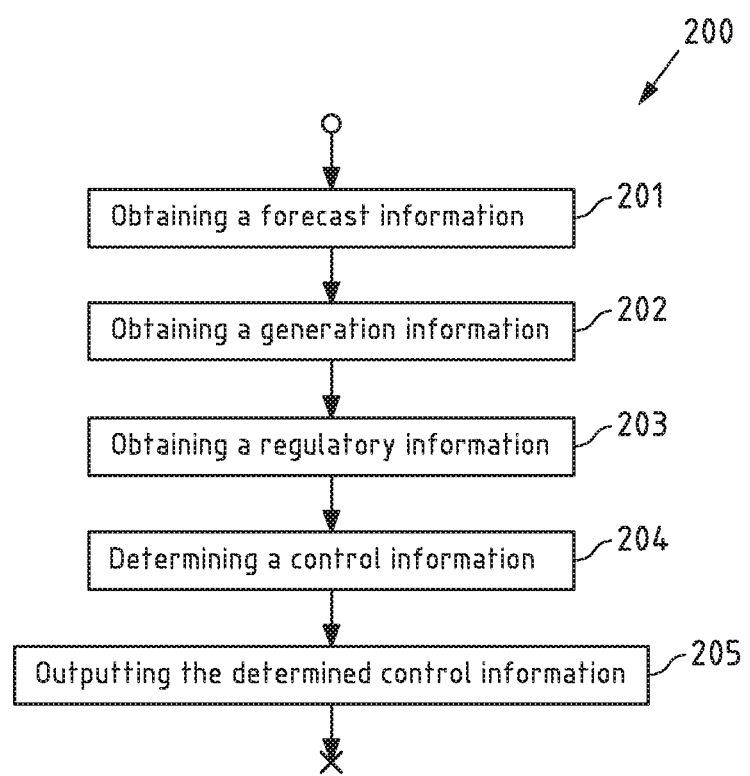
FIG. 2 is a flowchart of an exemplary method according to an embodiment.

FIG. 2 shows a flowchart 200 of an exemplary method according to an example embodiment. The flowchart 200 can for example be performed by an apparatus according to FIG. 5, wherein this apparatus is for example the apparatus 110 of FIG. 1.

In step 201 a forecast information is obtained. For example, the forecast information is obtained by apparatus 110 of FIG. 1 by accessing memory 180, e.g. via server 170.

In step 202 a generation information is obtained. The generation information can, for example, be obtained via the communication network 160 by a third-party provider who determines the generation information, for example based on a weather forecast for the power generation plant 150 according to FIG. 1.

In step 203, a regulation information is obtained. The regulation information is obtained, for example, by the apparatus 110 of FIG. 1 by accessing the memory 180 according to FIG. 1, e.g. via the server 170 according to FIG. 1.

In step 204, a control information is determined, e.g. by the apparatus 110 of FIG. 1. For this purpose, the apparatus 110 of FIG. 1 can access information stored in the memory 120 of FIG. 1 (e.g. forecast information, generation information, regulation information, to name but a few non-limiting examples).

In step 205, a determined control information is output or initiated to be output. The output can, for example, be performed by sending it to one or more power generating plants (e.g. power generation plant 150 of FIG. 1).

The determined control information is transmitted, for example, to the power generation plant 150 of FIG. 1, wherein one or more operating points of the power generation plant 150 of FIG. 1 can be set at least partially based on the control information that is output.

For example, the step of obtaining (step 201), and another step can be executed simultaneously, that is, in parallel.

Subsequently, for example, the step of determining the control information can take place, wherein the control information can be output after the control information has been determined. Alternatively, the step for obtaining forecast information (step 201), the step for obtaining generation information (step 202), and the step for obtaining regulation information (step 203) can be executed consecutively, that is, sequentially.

FIGS. 3*a-d* each comprise an exemplary table with information which is used in an exemplary method of an example embodiment.

As values from the FIGS. 3*a-d* are referred to in the other respective FIGS. 3*a-d*, the respective values are marked in the respective FIGS. 3*a-d* for better comprehensibility, e.g. line by line or section by section.

FIG. 3*a* shows forecast information for the respective times. Long-term forecast information is shown in columns 2 and 3 and day-ahead forecast information is shown in columns 4 to 6. Column 6 and column 7 show the sum of the previous forecast information. It can be seen that for the period from 7:00 to 8:00 152.7 MW of electrical energy is forecast.

FIG. 3*b* shows the respective amount of electrical energy generated for predetermined intervals of 15 minutes each. For example, to generate 152.7 MW for the hour from 7:00 to 8:00, 38.18 MWh must be generated every quarter of an hour.

FIG. 3*c* shows a generation information for the predetermined interval from 7:00 to 7:15, which was predicted immediately before the start of the predetermined interval, for example at 6:59. It can be seen that, compared with the forecast information according to FIG. 3*b*, 45.29 MWh of generated electrical energy is expected according to the generation information.

FIG. 3*d* shows the actual amount of electrical energy generated for each minute of the predetermined interval, present from 7:00 to 7:15. The right-hand column of FIG. 3*d* shows in each case a regulation information, which, contrary to the illustration, is recorded with a two minute delay. Consequently, the settlement information displayed in the line from minute 7:05 is only available at 7:07, so that the control information can only be determined once the settlement information has been entered. In contrast to the regulation information according to minutes 7:00 to 7:04, the regulation information from minute 7:05 represents negative prices, which is indicative of a sanctioning by the balancing energy market for overproduction of electrical energy. Every generated MWh of electrical energy that is overproduced causes sanctioning costs according to the value for money. For example, in order to minimize these, it is possible, after knowledge of such negative regulation information, to control and/or regulate one or more power generating plants in order to subsequently at least minimize these sanctioning costs, for example.

The following cases i) and ii) are examples of compensatory measures:
i) The power generating plants generate too much electrical energy:
  Downregulation of the power generating plants, to a maximum of the minimum stable load of the power generating plants;
ii) The power generating plants generate too little electrical energy:
  Re-regulation of power generating plants, if power generating plants do not yet produce electrical energy at maximum possible capacity.

Figure 4:
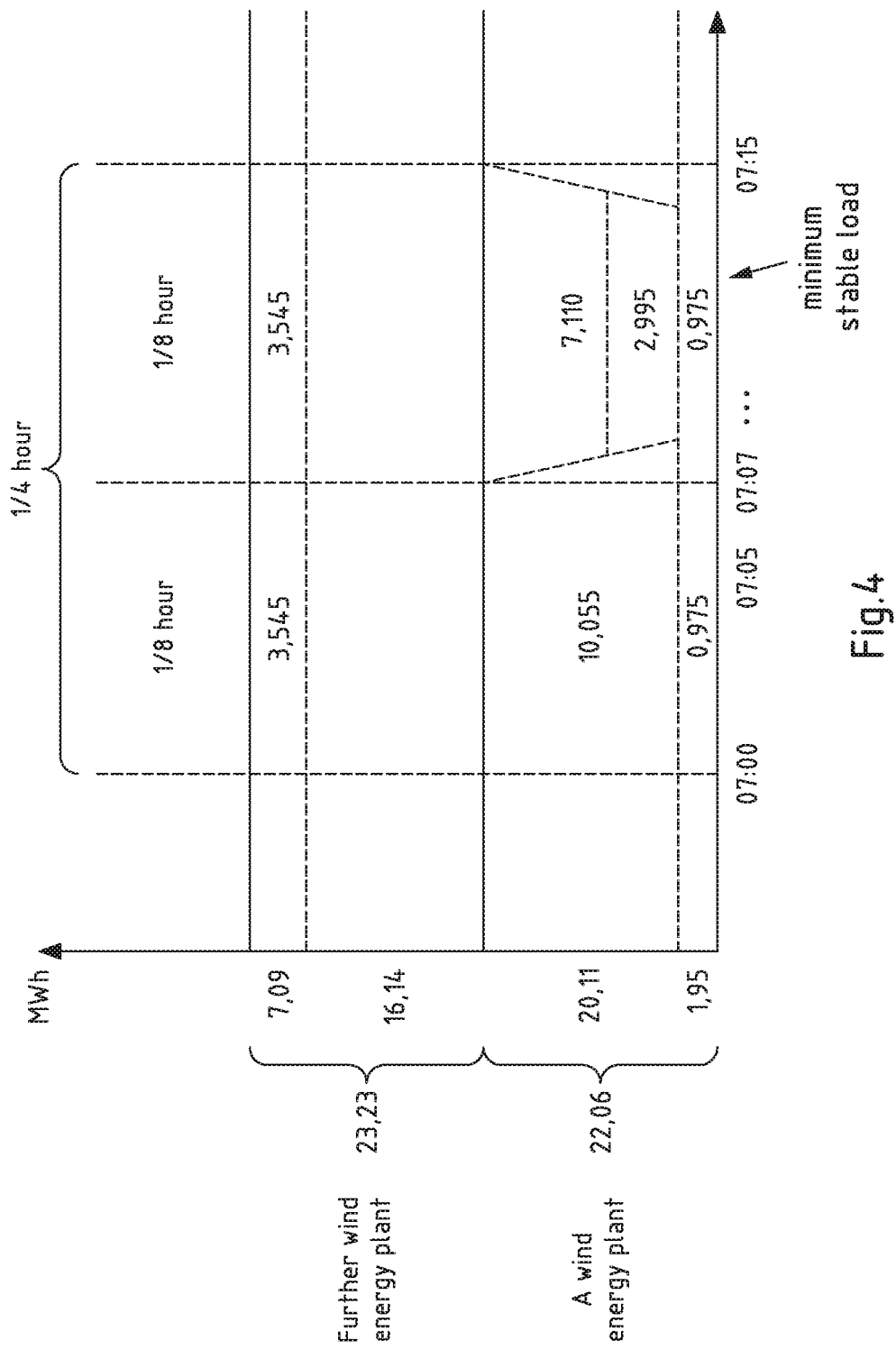
FIG. 4 is a schematic diagram showing an amount of electrical energy as a function of one or more operating points of one or more power generating plants, as applied in an exemplary method following an embodiment.

An example of a control and/or regulation (loop-based control) based on the information of FIGS. 3*a-d* is shown schematically in FIG. 4.

FIG. 4 shows a schematic diagram which depicts an amount of electrical energy as a function of one or more operating points of one or more power generating plants, as applied in an exemplary method according to an embodiment.

Up to the minute 7:07, the power generating plants generate with maximum possible capacity. From minute 7:07, based on a certain control information (step 204 according to FIG. 2), the power generation plant is controlled and/or regulated to set an operating point, wherein two possible variants are shown in FIG. 4, wherein in the first the power generation plant is, for example, turned down to 5% (marked with the arrow in the box "minimum stable load" in FIG. 4), so that in the remaining time 0.975 MWh of electrical energy is still generated by this turned down power generation plant. The second possibility is represented schematically by the other dotted line, wherein in the remaining time 2.995 MWh of electrical energy is still generated by this turned-down power plant. If there were no control and/or regulation of the power generation plant, 7.110 MWh of electrical energy would still be generated by this plant in the remaining period.

The diagonal lines starting from the time of minute 7:07 and running diagonally represent schematically the changing of an operating point of the power generation plant. First, the power generation plant is turned down at least partially based on the specific control information. Electrical energy is then generated for a certain period of time with a correspondingly reduced capacity of the power generation plant.

It can also be seen that in good time before the end of the predetermined interval—in this case from 7:00 to 7:15—the power generation plant is turned up by changing the operating point to 100% of the maximum possible generation capacity, which is reached at the end of the predetermined interval.

Figure 5:
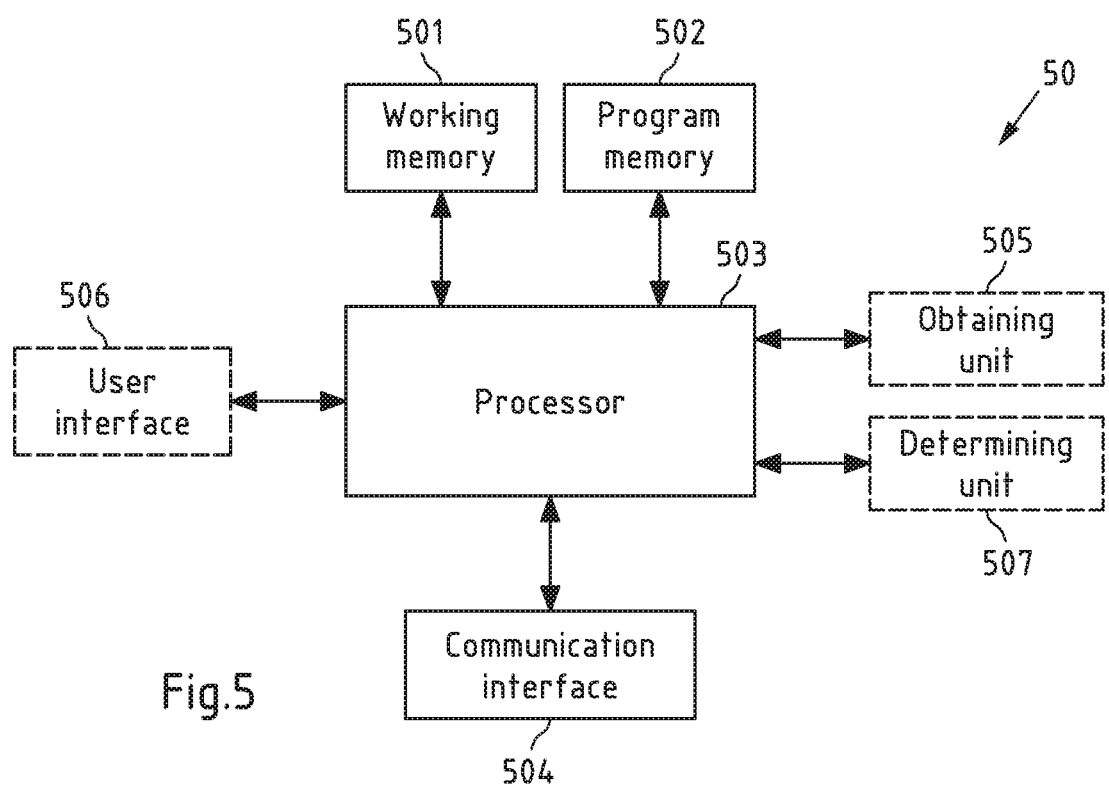
FIG. 5 is a schematic representation of an exemplary embodiment of an apparatus which can, for example, execute and/or perform a method according to all aspects.

FIG. 5 shows a schematic representation of an exemplary embodiment of an apparatus 50, which can be used in the context of all aspects.

The apparatus 50 can, for example, execute and/or control a method according to all aspects. To this end, the apparatus may, for example, have and/or comprise means for carrying out and/or performing the method of all aspects. The method of all aspects, may also be carried out and/or performed by several (i.e. at least two) apparatuses.

The apparatus 50 can, for example, execute the flow chart 200 of FIG. 2.

The apparatus 50 comprises a processor 503 with assigned working memory 501 and program memory 502, for example, the processor 503 executes program instructions stored in program memory 502. The program instructions execute and/or control the method (e.g. according to steps 201 to 205 in FIG. 2). Thus, program memory 502 comprises a computer program and represents a computer program product for storing it. Apparatus 50 represents an example of an apparatus of a system (e.g. the system 100 according to FIG. 1).

For example, program memory 502 can be a persistent memory such as read-only memory (ROM). For example, the program memory 502 can be permanently connected to the processor 503, but alternatively it can also be detachably connected to the processor 503, for example as a memory card, diskette, or optical data carrier medium (e.g. a CD or DVD). Additional information can also be stored in program memory 502, or in a separate memory.

The working memory 501 is used, for example, to store temporary results during the execution of program instructions. These are volatile memories, such as random access memory (RAM).

The processor 503 is also operatively connected to a communication interface 504, which allows, for example, information exchange with other apparatuses (see e.g. the arrows in FIG. 1). By means of the communication interface 504, for example, a certain control information can be output (step 205 according to FIG. 2).

The apparatus 50 can comprise further components. If the apparatus 50 represents the apparatus for executing and/or performing a method (e.g. server 110 according to FIG. 1), in particular a obtaining unit 505 is provided, which is set up, for example, to obtain forecast information, generation information and/or regulation information (steps 201 to 203 according to FIG. 2) and is operatively connected to the processor 503. Furthermore, a determining unit 507 is provided in particular, which is set up, for example, to determine a control information (step 204 according to FIG. 2) and is operatively connected to the processor 503.

As an option, apparatus 50 may have a user interface 506, allowing for example the playback of information (e.g. optical playback). For example, the user interface is a display apparatus (e.g. a liquid crystal display (LCD), or a light emitting diode (LED) display or similar). In addition, user interface 506 can be used to gather one or more user inputs, e.g. using a keyboard, mouse, or touch-sensitive display apparatus.

The embodiments of the present invention described in this specification and the optional features and characteristics mentioned in each case in this respect should also be understood as disclosed in all combinations with each other. In particular, unless explicitly stated otherwise, the description of a feature covered by an example embodiment should not be understood in the present case as meaning that the feature is essential or essential for the function of the embodiment. The sequence of the method steps described in this specification in the individual flowcharts is not mandatory, alternative sequences of method steps are conceivable. The method steps can be implemented in different ways, e.g. implementation in software (by program instructions), hardware or a combination of both to implement the method steps.

Terms used in the claims such as "comprise", "have", "include", "contain" and the like do not exclude further elements or steps. The expression "at least partially" covers both the "partially" and the "fully" case. The expression "and/or" should be understood as meaning that both the alternative and the combination should be disclosed, i.e. "A and/or B" means "(A) or (B) or (A and B)". The use of the indefinite article does not exclude a plural. A single apparatus can perform the functions of several units or apparatuses mentioned in the claims. Reference signs indicated in the claims are not to be regarded as limitations of the means and steps used.

All references, including publications, patent applications, and patents cited herein are hereby incorporated by reference to the same extent as if each reference were individually and specifically indicated to be incorporated by reference and were set forth in its entirety herein.

The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for controlling and/or regulating the amount of electrical energy generated by one or more power generating plants performed by one or more apparatuses, comprising:

obtaining a forecast information indicative of an amount of electrical energy generated by the one or more power generating plants that is to be generated within a predetermined interval;

obtaining a generation information representative of an amount of electrical energy generated by said one or more power generating plants, wherein said amount of generated electrical energy corresponds to said amount of electrical energy generated by said one or more power generating plants within said predetermined interval or is directly predicted for said predetermined interval;

obtaining a regulation information indicative of over- or underproduction of electrical energy generated by the one or more power generating plants for a given time within the predetermined interval if the specified interval has not yet expired and the amount of electrical energy to be generated according to the forecast information has already been generated for the specified interval, and vice versa;

determining a control information in the event that the regulation information is indicative of over- or underproduction, wherein the control information is indicative of a control and/or regulation of the amount of electrical energy generated by the one or more power generating plants, wherein the determining of the control information is at least partially based on the obtained regulation information and on the obtained generation information, wherein based on the determined time at which the regulation information is obtained, the remaining time of the predetermined interval is determined, wherein one or more operating points for the one or more power generating plants are determined such that for the remaining time of the predetermined interval, the amount of electrical energy generated by the one or more power generating plants for the predetermined interval saves or generates at least one determined difference between the amount of electrical energy generated according to the forecast information and according to the generation information, and wherein said determined one or more operating points are comprised by the control information, and wherein, based on the one or more operating points for controlling and/or regulating the one or more power generating plants, one or more control parameters for the one or more power generating plants are determined, which set the one or more power generating plants to the one or more operating points; and outputting or causing the outputting of the determined control information, wherein, based on the determined control information, a control and/or regulation of the one or more power generating plants is to be carried out.

2. The method according to claim 1, further comprising:
obtaining an availability information indicative of the availability of one or more power generating plants, wherein the control information is further determined based on the obtained availability information.

3. The method according to claim 1, wherein the obtaining of the regulation information is performed with a time delay to the obtaining of the generation information, and the remaining time of the predetermined interval is further determined based on the time delay.

4. The method according to claim 1, wherein the forecast information comprises at least one long-term forecast information and at least one day-ahead forecast information which together totals the amount of electrical energy generated by the one or more power generating plants which is generated within the predetermined interval.

5. The method according to claim 1, wherein the determining of the control information takes into account the time required to control and/or regulate the one or more power generating plants to the determined one or more operating points of the one or more power generating plants.

6. The method according to claim 5, wherein the determining of the control information further comprises:
obtaining a remaining time information indicative of a time period until which the output or the initiation of the output of the determined control information must have taken place in order to control and/or regulate the one or more power generating plants to the maximum possible generation amount of electrical energy of the one or more power generating plants before the expiry of the predetermined interval,
wherein the determining of the control information is further based on the obtained remaining time information.

7. The method according to claim 1, wherein the determining of the control information further comprises:
determining of a surplus information, wherein the surplus information determines those power generating plants of the one or more power generating plants which are to be reduced in the amount of generated electrical energy and which sanctioning causes the lowest costs, in the case that despite the maximum possible amount of generated electrical energy of the one or more power generating plants the amount of electrical energy is not generated according to the forecast information.

8. The method according to claim 1, wherein the one or more operating points have a lower limit which limits the minimum possible generating capacity of the respective power generating plant downwards.

9. The method according to claim 1, wherein the one or more power generating plants comprise one or more power generating apparatuses, wherein the determined control information sets the respective operating point for the respective power generating apparatus in dependence on the operating points of the respective power generating plants, wherein the at least one operating point for the respective power generating plant is determined in such a way that the one or more power generating plants cumulatively save or generate more the difference of the amount of generated electric energy according to the generation information that is determined between the control information and the forecast information.

10. The method according to claim 1, wherein the control information further determines, taking into account that the one or more operating points of the one or more power generating plants is controlled and/or regulated again to the respective maximum possible generation power of electrical energy before the expiry of the predetermined interval.

11. The method according to claim 1, wherein the one or more operating points of the one or more power generating plants are automatically triggered to the maximum possible generation output of electrical energy by the one or more power generating plants at a point in time which lies before the expiry of the predetermined interval and is determined in such a way that with the expiry of the predetermined interval the one or more operating points of the one or more power generating plants are again controlled and/or regulated to the maximum possible generation output of electrical energy.

12. The method according to claim 1, wherein the one or more power generating plants are photovoltaic plants, wind energy plants, hydroelectric or hydroelectric power plants, or a combination thereof.

13. The method according to claim 1, wherein the determining of the control information further comprises:
determining a prediction information indicative of a predicted regulation information for a period shorter than the remaining period of the predetermined interval, wherein the prediction information is determined based on historical information,
wherein the control information is further determined based on the determined prediction information.

14. A system comprising one or more apparatuses which together are configured and/or arranged to perform a method according to claim 1.

15. The system according to claim 14, further comprising one or more power generating plants which are configured and/or arranged to set one or more operating points based on control information determined and output by the one or more apparatuses.

* * * * *